US007045076B2

(12) United States Patent
Hartley et al.

(10) Patent No.: US 7,045,076 B2
(45) Date of Patent: *May 16, 2006

(54) DEICING SOLUTION

(75) Inventors: Robert A Hartley, Ontario (CA); David H. Wood, Rome, NY (US)

(73) Assignee: Sears Petroleum & Transport Corp. & Sears Ecological Applications Co., LLC, Rome, NY (US)

(*) Notice: Subject to any disclaimer, the term of this patent is extended or adjusted under 35 U.S.C. 154(b) by 11 days.

This patent is subject to a terminal disclaimer.

(21) Appl. No.: 10/913,175

(22) Filed: Aug. 6, 2004

(65) Prior Publication Data

US 2005/0017214 A1   Jan. 27, 2005

Related U.S. Application Data

(63) Continuation-in-part of application No. 10/444,559, filed on May 23, 2003, now Pat. No. 6,827,873, which is a continuation of application No. 10/260,808, filed on Sep. 30, 2002, now Pat. No. 6,582,622, which is a continuation-in-part of application No. 10/212,319, filed on Aug. 5, 2002, now Pat. No. 6,596,188, and a continuation-in-part of application No. 10/212,318, filed on Aug. 5, 2002, now Pat. No. 6,599,440, said application No. 10/212,319 and a continuation-in-part of application No. 09/971,163, filed on Oct. 4, 2001, now Pat. No. 6,440,325, and a continuation-in-part of application No. 09/971,165, filed on Oct. 4, 2001, now Pat. No. 6,436,310, said application No. 10/212,318 and a continuation-in-part of application No. 09/971,163, and a continuation-in-part of application No. 09/971,165, , said application No. 09/971,163 and a continuation-in-part of application No. 09/755,587, filed on Jan. 5, 2001, now Pat. No. 6,299,793, said application No. 09/971,165 and a continuation-in-part of application No. 09/755,587, filed on Jan. 5, 2001, now Pat. No. 6,299,793, is a continuation-in-part of application No. 09/224,906, filed on Jan. 4, 1999, now abandoned.

(60) Provisional application No. 60/070,636, filed on Jan. 7, 1998.

(51) Int. Cl.
*C09K 3/18* (2006.01)

(52) U.S. Cl. .......................... 252/70; 106/13
(58) Field of Classification Search ............ 252/70; 106/13
See application file for complete search history.

(56) References Cited

U.S. PATENT DOCUMENTS

| 4,668,416 A | 5/1987 | Neal |
| 4,676,918 A | 6/1987 | Toth et al. |
| 4,746,449 A | 5/1988 | Peel |
| 4,824,588 A | 4/1989 | Lin |
| 5,135,674 A | 8/1992 | Kuhajek et al. |
| 5,635,101 A | 6/1997 | Janke et al. |
| 5,639,319 A | 6/1997 | Daly |
| 5,709,812 A * | 1/1998 | Janke et al. ............ 252/70 |
| 5,709,813 A | 1/1998 | Janke et al. |
| 5,772,912 A | 6/1998 | Lockyer et al. |
| 5,919,394 A * | 7/1999 | Janke et al. ............ 252/70 |
| 5,922,240 A | 7/1999 | Johnson et al. |
| 5,932,135 A | 8/1999 | Janke et al. |
| 5,965,058 A * | 10/1999 | Janke et al. ............ 252/70 |
| 6,080,330 A | 6/2000 | Bloomer |
| 6,149,834 A | 11/2000 | Gall et al. |
| 6,299,793 B1 | 10/2001 | Hartley et al. |
| 6,398,979 B1 | 6/2002 | Koefod et al. |
| 6,416,684 B1 | 7/2002 | Bloomer |
| 6,436,310 B1 | 8/2002 | Hartley et al. |
| 6,440,325 B1 | 8/2002 | Hartley et al. |
| 6,468,442 B1 | 10/2002 | Bytnar |
| 6,843,931 B1 | 1/2005 | Sapienza |

FOREIGN PATENT DOCUMENTS

| RU | 1664808 | 7/1991 |
| WO | 01/07532 A1 | 2/2001 |

OTHER PUBLICATIONS

T.W. Graham Solomons and Craig B. Fryhle, Organic Chemistry 7th edition, pp. 1124-1125, no date.
Phytic Acid: Chemistry and Application, Edited by Ernst Graf, Pilatus Press, Minneapolis, MN, 1986, ISBN 0-9614915-0-7, pp. 1-21 and 118-125, no month.
CRC Handbook of Chemistry and Physics, A Ready-Reference Book of Chemical and Physical Data, David R. Lide, 78th Edition 1997-1998, pp. 8-56, 8-61, 8-64, 8-73, 8-74, no month.
Composition of Corn Steep Water during Steeping, Steven R. Hull, Byung Yun Yang, David Venzke, Kurt Kulhavy and Rex Montgomery, J. Agic. Food Chem. 1996, 44, 1857-1863, no month.
Brewers Condensed Solubles. J. Composition and Physical Properties, B.R. Sebree, D.S. Chung and P.A. Seib, vol. 60, No. 2, 1983, pp. 147-151, no month.
Determination of the Carbohydrate Components of the Low Molecular Weight Fraction and Fraction E., Report No. 99-B21E-0050 (Interim No. 8) 4 pages, 2 Appendices, Dated Aug. 30, 1999.

(Continued)

*Primary Examiner*—Anthony J. Green
(74) *Attorney, Agent, or Firm*—Wall Marjama & Bilinski LLP

(57) ABSTRACT

A deicing formulation which includes at least one carefully selected and further processed agricultural by-product selected from BCS, DCS and CCSL, a chloride salt and water. The formulation has a viscosity of 100 to 140 centipoises at 0° C. (32° F.), and a liquid adhesion rating of at least 4. Each of BCS, DCS and CCSL contain a low molecular carbohydrate fraction in an amount sufficient to lower the freezing point threshold value of the formulation.

19 Claims, No Drawings

OTHER PUBLICATIONS

Low-D.E. Corn Starch Hydrolysates, Multi-functional carbohydrates aid in food formulation, Reprinted from Food Technology, vol. 5, No. 3, pp. 38-40, Copyright 1972 by Institute of Food Technologists, Daniel G. Murray and Leslie R. Luft, no month.

Slip-sliding away, Southbridge-Evening News, Southbridge, MA, Feb. 16, 1998, Bruce Uptom.

Public Works Engineering, Construction & Maintenance, Jul. 1997.

Civil Action No. 5:03-CV-0530 (DEP), Decision and Order, Aug. 27, 2004, 125 pages.

Civil Action No. 5:03-CV-0530 (DEP), Judgment, Apr. 12, 2005, 6 pages.

* cited by examiner

DEICING SOLUTION

This is a continuation-in-part of U.S. Ser. No. 10/444,559, now U.S. Pat. No. 6,827,873 filed May 23, 2003 (Granted Dec. 7, 2004, which is a continuation of U.S. Ser. No. 10/260,808, now U.S. Pat. No. 6,582,622, filed Sep. 30, 2002 (Granted Jun. 24, 2003), which is a continuation-in-part of U.S. Ser. No. 10/212,319, now U.S. Pat. No. 6,596,188, filed Aug. 5, 2002 (Granted Jul. 22, 2003), and a continuation-in-part of U.S. Ser. No. 10/212,318, now U.S. Pat. No. 6,599,440, filed Aug. 5, 2002 (Granted Jul. 29, 2003), which both are a continuation-in-part of application U.S. Ser. No. 09/971,163 now U.S. Pat. No. 6,440,325 and U.S. Ser. No. 09/971,165 now U.S. Pat. No. 6,436,310 both filed on Oct. 4, 2001 (Granted Aug. 27, 2002 and Aug. 20, 2002, respectively), which are both a continuation-in-part of U.S. Ser. No. 09/755,587, now U.S. Pat. No. 6,299,793, filed Jan. 5, 2001 (Granted Oct. 9, 2001), which is a continuation-in-part application of U.S. Ser. No. 09/224,906 filed on Jan. 4, 1999, now abandoned and U.S. Ser. No. 60/070,636 filed Jan. 7, 1998, the entirety of each of the above applications which are incorporated herein by reference.

BACKGROUND OF THE INVENTION

The current state of the art for coping with snow and ice on roads usually involves applying a deicer material such as a salt to the road surface. Sometimes antiskid materials such as sand or other aggregates such as gravel are added with or without a salt.

The use of salt and compositions having high concentrations of salt, cause an undesirable corrosive effect on vehicles, the road surface, and the environment with respect to the run off of water containing salt which contaminates the surrounding land and water.

Considering the above problems associated with salt formulations, there has been a continuing need for a deicing composition or formulation which can effectively melt snow and ice yet which reduces the corrosion and environmental contamination referred to above. In response to the above problems associated with the use of road salt, the prior art has looked to alternative formulations which are less corrosive and more environmentally friendly.

U.S. Pat. No. 5,922,240 (Johnson et al.) relates to a deicing composition comprising brewers' condensed solubles produced, for example, as by-products from a commercial beer brewing process, which by-products are biodegradable. The invention also relates to the use of a deicing composition to reduce the buildup of snow and ice on road, bridges and other outdoor surfaces.

U.S. Pat. No. 5,635,101 (Janke et al.) relates to a deicing composition containing a by-product of a wet milling process of shelled corn. Corn kernels are steeped or soaked in a hot solution containing small amounts of sulfurous acid. The corn kernels are separated from the steep water and steep water solubles are used in the production of a deicing composition.

U.S. Pat. No. 4,676,918 (Toth et al.) relates to a deicing composition which comprises a mixture containing at least one component selected from a number of chlorides or urea and an admixture of waste concentrate of alcohol distilling that has a dry substance content of from 200 to 750 g/kg and from 10% to 80% by weight of water.

The materials described in the above three patents are naturally occurring substances with hundreds (if not thousands) of components such as complex carbohydrates, starches, sugars, proteins etc. and are normally used with a salt.

The above described de-icing solutions which employ agricultural residues e.g., corn based distillers solubles and solubles from the corn wet milling industries, brewers condensed solubles, and distillers condensed solubles are extremely variable in composition, viscosity, film forming tendency, freezing temperature, pH etc., and consequently give varying performance when used in de-icing solutions. Depending upon the source and batch, these materials at low temperatures sometimes exhibit such resistance to flow that they cannot be applied evenly to a road surface or mixed with a chloride, rendering them virtually unsuitable for use.

Furthermore, these patents utilize materials which have highly undesirable or unnecessary ingredients leading to practical difficulties by manufacturers and users, such as stratification in storage, biological degradation, odor, plugging of filters and spray nozzles and environmental difficulties e.g. high biological oxygen demand due to the very high organic contents (about 40% by weight), and the presence of phosphorus compounds, cyanide and heavy metals.

To improve quality and performance, and to meet current mandated standards, there has been a continuing need for a source of carefully controlled agricultural residuals and by-products which exhibit improved performance and reduce metal corrosion, spalling of concrete, toxicity and address environmental concerns.

It is therefore an object of the present invention to provide a deicing formulation which exhibits improved performance standards which overcomes the prior art problems described above.

It is a further object of the present invention to provide a deicing formulation which utilizes a synergistic combination of an improved agricultural carbohydrate and an inorganic freezing point depressant.

It is another object of the present invention to provide a deicing formulation which utilizes an improved agricultural residual and/or by-product to provide for improved ice melting properties and exhibits less corrosion.

It is a further object of the present invention to provide a deicing formulation which provides consistent physical and chemical properties, thereby assuring consistent quality and performance.

It is another object of the present invention to provide an economical, highly effective deicing formulation.

SUMMARY OF THE INVENTION

The present invention is based upon the discovery that by carefully controlling the specifications for certain selected agricultural residuals and by-products, when used in a deicing formulation with an inorganic freezing point depressant, that a synergistic effect upon freezing point depression occurs.

More specifically, the present invention is based on the use of certain agricultural by-products namely BCS, DCS or steepwater modified and/or reformulated to meet certain specifications and characteristics which provide for a highly effective deicing and anti icing formulation when used in an aqueous solution with a chloride salt.

The basic composition of the present invention consists of at least the first two of the following three components in aqueous solution depending upon ambient weather conditions, terrain, nature and amount of freezing/snow precipitation, and environmental concerns:

(1) Inorganic freezing point depressants preferably in the form of chloride salts which include magnesium chloride, calcium chloride and sodium chloride. Metal acetates e.g. calcium magnesium acetate, may also be used.

(2) At least one agricultural product selected from BCS, DCS and/or steepwater which contains a low molecular weight carbohydrate fraction in the 180 to 1,500 range (180–1,000 preferred). The present invention is based upon the formulation and control of certain key properties of the above described agricultural materials to optimize their synergism when used with a chloride salt in a deicing formulation. The materials are formulated to provide for the control of viscosity, adhesion, slipperness, freezing point and concentration and size of solids. The formulation typically has a viscosity in the range of about 100 to 140 centipoises at 0° C. (32° F.). The level or concentrations of heavy metals, phosphorus and cyanide are also carefully controlled to meet environmental requirements. Where needed, defoamers are used to eliminate foam and/or prevent foam formation. Optionally biocides are employed in concentrations sufficient to eliminate or prevent the formation of deleterious molds, yeasts, slimes and bacteria.

(3) Thickeners are optionally used in certain applications as the third component to increase the viscosity of the composition so that the liquid remains in contact with the road surface or with the solid particles in piles of rocksalt/sand, or rocksalt/aggregates, or salt alone, or sand or aggregate. Thickeners are mainly cellulose derivatives or high molecular weight carbohydrates. Typical molecular weights for cellulose derivatives are for methyl and hydroxy propyl methyl celluloses from about 60,000 to 120,000 and for hydroxy ethyl celluloses from about 750,000 to 1,000,000. Carbohydrate molecular weights range from about 10,000 to 50,000.

These components are used in an aqueous solution in the following concentrations:

TABLE 1

|  | Weight % |
| --- | --- |
| BCS, DCS, Steepwater* | 3 to 60 |
| Inorganic Freezing Point Depressant | 5 to 35 |
| Thickener | 0.15 to 10 |
| Water | Balance |

*Wt % of low molecular weight carbohydrate fraction included in BCS, DCS and steepwater.

The above described compositions provide a de-icing and anti-icing formulation which can be formulated more uniformly to provide for more consistent properties from batch to batch, while at the same time providing for increased ice melting properties.

DETAILED DESCRIPTION OF THE INVENTION

For purposes of this invention, the following definitions appropriately define the three agricultural products in question: Brewer's condensed solubles (BCS) may be defined as by-products from a commercial beer brewing process and are more fully defined in U.S. Pat. No. 5,922,240 which is incorporated herein by reference. Distillers condensed solubles (DCS) may be defined as the waste concentrate of the alcohol distilling industry and are more fully defined in U.S. Pat. No. 4,676,918 which is incorporated herein by reference. Steepwater solubles or condensed corn steep liquor (CCSL) may be defined as a by-product of a wet milling process of shelled corn which is more fully defined in U.S. Pat. No. 5,635,101 which is incorporated herein by reference.

It has been shown (U.S. Pat. No. 6,299,793) that the presence and concentration of low molecular weight carbohydrates has a synergistic effect on the freezing point and ice/snow melting characteristics of chloride containing liquid deicers. To modify these properties of agricultural by-products, such as DCS and BCS liquors it is necessary to initially analyze these liquids and determine the carbohydrate content and profile.

A general analysis demonstrates total carbohydrates, proteins, inorganics, etc as shown in Table 2:

TABLE 2

| Properties | Sugar Cane By-Product (Colombian) | Brewer's Condensed Solubles |
| --- | --- | --- |
| Total Solids | 48.5% by wt. | 43.6% by wt. |
| Total inorganics | 11.2% by wt. | 2.9% by wt. |
| Total Organics | 37.3% by wt. | 40.7% by wt. |
| Total Proteins | 5.8% by wt. | 3.6% by wt. |
| Total Carbohydrates | 6.6% by wt. | 30.5% by wt. |
| Total other organics | 24.9% by wt. | 6.6% by wt. |

The relevant analytical methods were the anthrone/sulfuric acid procedure for carbohydrates and the Kjeldahl method for nitrogen where the protein content equals the nitrogen content multiplied by 6.25. The above demonstrates the applicable difference in carbohydrate contents of two typical by-products used in liquid deicers.

Analysis for the low molecular weight carbohydrates contents has been carried out using either high pressure liquid chromatography or gel permeation chromatography. The Brewer's Condensed Solubles in admixture with magnesium chloride aqueous solution gave a freezing point of −35.5° C./−31.9° F. and the carbohydrate profile was determined employing a high pressure liquid chromatography technique as shown in Table 3.

TABLE 3

| Carbohydrate | Molecular Weight | % by Weight |
| --- | --- | --- |
| Glucose | 180 | 2.6 |
| Maltose | 342 | 14.3 |
| Maltotriose | 504 | 4.4 |
| Tetrasaccharide | 666 | 1.4 |
| Pentasaccharide | 828 | 0.6 |
| Hexasaccharide | 990 | Nil |
| Heptasaccharide | 1152 | 1.6 |
| Higher saccharides | — | 16.0 |

The following is a more specific analysis of DCS, BCS and CCSL with respect to variables in the product with respect to the source and other factors.

Composition of Agricultural By-Products.

Appreciable variations occur in each agricultural by-product group due to:

(a) type and variety of seed, soil conditions, fertilizer types and amounts used, temperature, rainfall, soil moisture content. Conditions during seed germination are particularly important.

(b) the type and conditions of post harvest treatments including storage and industrial processes. In particular industrial hydrolysis conditions e.g. time, temperature, pH, cause great variations in the composition of the by-products. The steeping process employed in the product of corn steep liquors employs the use of sulfur dioxide and the presence of various microorganisms especially lactobacilli.

Distilled Condensed Solubles (DCS).

For example, the variability of sugar cane by-product can be shown by Table 4 for DCS obtained from four different sources:

TABLE 4

| Component | Italian | Nassau | Colombian | Venezuelan |
| --- | --- | --- | --- | --- |
| Total Solids (%) | 55.0 | 54.4 | 48.5 | 56.4 |
| Ash Content (%) of dry weight | 27.4 | 29.5 | 11.15 | 29.4 |
| Chloride (% of dry weight) | — | 7.8 | 0.8 | 2.4 |
| Sulfate (ppm) | 4,300 | 42,500 | 12,000 | — |
| Phosphorus (ppm) | 220 | 510 | 340 | 426 |
| Total Protein (%) | 5.8 | 18.8 | 5.8 | 7.6 |
| Total Carbohydrates (%) | 5.5 | 8.2 | 6.6 | 8.2 |

The Colombian DCS was analyzed in Table 5 for carbohydrates by gel permeation chromatography:

TABLE 5

| Saccharide | Name | Molecular Weight | Concentration (%) |
| --- | --- | --- | --- |
| mono- | Glucose/Fructose | 180 | 2.0 |
| di- | Sucrose | 342 | NiL |
| tri- | Maltotriose | 504 | 1.6 |
| hexa- | Maltohexose | 990 | 1.6 |
| nona- | Maltononose | 1476 | 1.2 |
| Higher | | Greater than 13,000 | 0.2 |

Brewers Condensed Solubles (BCS).

The variable nature of commercially available by-products is reported in the scientific literature (Sebree, B. R. et al. Cereal Chemistry, Vol. 60, No. 2, 1983). Here 12 samples were collected on successive days at a brewery (Anheuser Busch, Merrimack, Mass.) and analyzed as shown in Table 6:

TABLE 6

| | |
| --- | --- |
| Total Solids | 44.4±7.4% |
| Suspended Solids (dry basis) | 6.9±1.9% |
| Soluble solids (dry basis) | 93.1±1.9% |
| Crude fiber | 2.1±0.2% |
| Ash | 2.5±0.2% |
| Protein (dry basis) | 8.8±1.1% |
| Carbohydrates (dry basis) | 74.8±5.9% |

The carbohydrate analysis for the above 12 samples is expressed as a percentage of the dry basis as shown in Table 7:

TABLE 7

| Saccharide | Name | Molecular Weight | Concentration (% dry basis) |
| --- | --- | --- | --- |
| mono- | Glucose | 180 | 5.8 ± 0.8 |
| di- | Maltose | 342 | 32.3 ± 4.2 |
| tri- | Maltotriose | 504 | 9.9 ± 0.8 |
| tetra- | Maltotetrose | 666 | 3.1 |
| penta- | Maltopentose | 828 | 1.3 |
| hexa- | Maltohexose | 990 | NiL |
| hepta- | Maltoheptose | 1152 | 3.7 |
| Higher | — | Greater than 1314 | 18.6 |

The suspended solids and crude fiber create difficulties during storage and blockage of spray tips during application of liquid deicers/anti-icers made with BCS.

Condensed Corn Steep Liquor (CCSL).

This useful by-product is produced by the counter current flow of dried corn kernels and water initially containing sulfur dioxide using a series of steeping tanks at 50 to 55° C. (122 to 131° F.) over a period of 24 to 30 hours. Microorganisms, especially lactobacilli, cause fermentation to occur. Finally the corn extract is subjected to evaporation in order to remove excess water yielding the condensed liquor.

The composition of the condensed corn steep liquor (CCSL) has been examined in detail and reported in the literature:

(a) Hull, S. R. et al. J. Agric. Food Chemistry, 1996, 44, 1857 to 1863.

(b) Hull, S. R. et al. J. Agric. Food Chemistry, 1996, 44, 3521 to 3527.

In reference (a) above four different manufacturers liquors were analyzed. The total carbohydrate content varied from 2.7% to 9.6%.

The complexity and variability of CCSL from these four different sources is demonstrated by the identification and determination of the contents of five different monosaccharides and five di- and tri-saccharides. The contents may be summarized:

| | |
| --- | --- |
| Monosaccharides | 1.0% to 6.0% |
| Di- and tri-saccharides | 0.3% to 0.85%. |

In the development of the present invention it was determined that the predominant organic constituents in the prior art formulations described above were carbohydrates, and in one series of tests, Brewers Condensed Solubles (BCS), which was selected as a test sample, was diluted with water and separated into several fractions by the addition of increasing amounts of an ethanol/methanol 85/15 v/v mix. The characteristic of the various fractions and their freezing points when mixed with 15% magnesium chloride are tabulated below in Table 8.

TABLE 8

| Sample | % ethanol/ methanol added | % Solids | % Carbohydrates | Freezing Point ° F. | Freezing Point ° C. |
| --- | --- | --- | --- | --- | --- |
| BCS | NIL | 43.6 | 43.1 | −31.9 | −35.5 |
| Fraction A Precipitate | 60 | 5.3 | 3.8 | −10.1 | −23.4 |
| Fraction B Precipitate | 74 | 3.7 | 3.2 | −10.8 | −23.8 |
| Fraction C Precipitate | 82 | 2.8 | 2.1 | −10.3 | −23.5 |
| Fraction D Precipitate | 85 | 1.3 | 0.6 | −9.9 | −23.3 |
| Fraction E Solubles | 85 | 30.7 | 29.8 | −22.7 | −30.4 |

Fraction A consisted of essentially insoluble, high molecular weight polysaccharides, whereas Fractions B to D inclusive gave gummy residues of polysaccharides. Fractions A to D had little effect upon freezing point depression.

Fraction E, the largest component, had a considerable effect upon freezing point and is a mixture of lower molecular weight polysaccharides.

Fraction E was also examined in Table 9 for ice melting characteristics at 25° F. (−4° C.) in admixture with magnesium chloride employing SHRP H-205.2 Test Method for Ice Melting of Liquid Deicing Chemicals.

TABLE 9

| Deicing Solution | Lbs weight ice melted per lb weight of inorganic salt |
| --- | --- |
| 15% magnesium chloride, control | 16.9 |
| BCS/MgCl$_2$ | 18.2 |
| Fraction E/MgCl$_2$ | 19.3 |
| 32% calcium chloride | 7.3 |
| 26.3% sodium chloride | 7.5 |

The last two figures were calculated from data in SHRP H-205.2. These results indicate the appreciable improvement over the commonly used sodium and calcium chlorides in ice melting characteristics when Fraction E and BCS are mixed with magnesium chloride. There is also a 14% improvement over the control when Fraction E is used. This, together with freezing point depression improvement indicates that an appreciably improved deicing solution can be formulated.

The next stage of the investigation consisted of attempting to isolate and define the active components in the BCS. This was done by first filtering employing a 0.45 micron membrane followed by ultrafiltration using a Model UFP-1-E-s (A/G Technology Corporation, Needham, Mass.) with a nominal cutoff at a molecular weight of 1000 and finally gel permeation chromatography (GPC) using a Waters LC Module 1 unit with a set of three ultrahydrogel columns and 50 mm Na$_2$HPO$_4$ solution at pH7 as the mobile phase. The BCS liquor had two major carbohydrate fractions (a) a low molecular weight fraction with the majority of components having a molecular weight of less than 1000, and (b) a high molecular weight fraction containing compounds with a molecular weight of 12,600 but with some components in the 1000 to 10,000 molecular weight range. Fraction E was found to have a chromatographic profile very similar to the low molecular weight fraction (a) above with a molecular weight of less than 1000. Cane Sugar DCS liquor had more components than the BCS but had similar high and low molecular weight fractions with similar molecular weight distributions.

In order to confirm that the low molecular weight fraction has the greatest effect upon freezing point depression, a further series of freezing points were measured using in this instance, Dead Sea Salt Solution from Jordan in lieu of laboratory grade magnesium chloride. Again the concentration of magnesium chloride was 15% by weight for all samples.

TABLE 10

| Sample | Freezing Point | |
| --- | --- | --- |
| | ° F. | ° C. |
| Control: Industrial grade magnesium chloride solution/Water | −0.4 | −18.0 |
| BCS | −31.9 | −35.5 |
| BCS GPC High Mol Wt Fraction | −5.1 | −20.6 |

TABLE 10-continued

| Sample | Freezing Point | |
| --- | --- | --- |
| | ° F. | ° C. |
| BCS GPC Low Mol Wt Fraction | −16.4 | −26.9 |
| BCS Fraction E | −13.4 | −25.2 |

It was thus shown that low molecular weight (less than 1000) carbohydrates had the greatest effect upon freezing point depression. Based upon these experiments, it was concluded that the formulation of deicing/anti-icing compositions should employ compounds in the less than 1000 molecular weight range such as those tabulated below in Table 11:

TABLE 11

| Carbohydrate | Molecular Weight |
| --- | --- |
| Glucose/fructose | 180 |
| Disaccharides | 342 |
| Trisaccharides | 504 |
| Tetrasaccharides | 666 |
| Pentasaccharides | 828 |
| Hexasaccharides | 990 |

For each of BCS, DCS and CCSL there is a minimum low molecular weight carbohydrate fraction concentration that is necessary for suitable performance as a deicing formulation component. This necessary threshold concentration in weight % is different for each of these carbohydrates and is tabulated in Table 12 below:

TABLE 12

| | Wt % |
| --- | --- |
| BCS | 25.0 |
| DCS | 8.0 |
| CCSL | 6.0 |

Should the agricultural by-product need modification then the freezing point can be further depressed by using corn syrups with dextrose equivalents in the 42 to 64 range. For each 1° C. (1.8° F.) decrease it is found that about 1% by weight should be added. Alternatively glucose was found to decrease freezing point by 0.5° C. (0.9° F.) approximately by the addition of 0.75% be weight of solid glucose. The formulation should have a freezing point—threshold value of about −25° C. (−13° F.) which means that the carbohydrate is in a concentration sufficient to reduce the freezing point of the formulation to at least as low as about −25° C. (−13° F.).

Microbiological Degradation of Liquid Deicers and their Components.

It has been observed that during summer storage microbiological attack occurs on some deicers and almost all of the organic aqueous components from agricultural by-products. Under suitable conditions bacteria, fungi, molds and their associated enzymes cause degradation of the carbohydrates, proteins, amino acids etc leading to odors, slime formation, molds resulting in obnoxious solutions with reduced viscosity and the precipitation of complex mixtures.

The DCS and BCS were found to contain microbiological entities as shown in Table 13 below:

TABLE 13

| Component | Microbiological Bacteria (CFU/ml) | Concentrations of Mold (CFU/ml) |
|---|---|---|
| BCS | 150 | None |
| DCS (Columbian) | 250 | 850 |
| Industrial Magnesium Chloride Solution | None | None | where CFU means Colony Forming Units

When liquid deicers were made by mixing equal volumes of the industrial $MgCl_2$ solution and the organic component, then challenged using 10 million/ml of a yeast mold *Saccharomyces cerevisiae* under aerobic conditions at room temperature for 57 days, it was found that there was only a twofold increase in CFU/ml values. Therefore all DCS, BCS etc solutions should be converted to deicer by adding the $MgCl_2$ solution. The presence of $MgCl_2$ largely prevents microbiological degradation at levels of 15% $MgCl_2$ by weight or greater.

If the organic component liquors cannot be converted to deicer then they must be treated against microbiological attack. Although there are a very wide range of biocides, the simplest and most economical treatment is with sodium metabisulfite $Na_2 S_2 O_5$ by adding at a rate of about 2.5 ozs per 1000 gallons of liquid. This gives an $SO_2$ level of approximately 10 parts per million.

Liquid Adhesion Properties.

The adhesion of liquid deicer films to road surfaces and stockpile components is an important property and contributes to the performance of the deicer. The viscosity factor alone does not measure this adhesive/stickiness characteristic. It has been found that measuring and examining the rheological properties of liquid deicers does not elucidate these adhesive properties. Liquids with high adhesive properties have elastic characteristics which are due to the structures developed in the liquid at low shear rates.

Consequently, a simple practical test was used which consisted of dipping a microscope slide 3 mms into the test solution at room temperature 24° C. (75.2° F.), 5° C. (41° F.) and −20° C.) (−4° F.). The microscope slide was withdra the liquid and the time to drain off was noted. The wetted area was lightly touched by a rubber gloved finger and the tendency to adhere and pull away from the slide was observed. In particular the length of the liquid thread before rupture was noted carefully. The evaluation was given an arbitrary numerical rating where 0 was very poor and 5 excellent adhesion. It has been determined that a liquid adhesion rating of at least 4 or more is necessary for formulations of the present invention to function effectively as a deicer and/or anti-icing agent.

Typical values for a range of potential deicers containing 15% $MgCl_2$ at −20° C. (−4° F.) are shown in Table 14 below:

TABLE 14

| Component | Liquid Adhesion Rating | Comments |
|---|---|---|
| 15% $MgCl_2$ aqueous solution | 0 | No adhesion |
| Molasses By-product (Venezuelan) | 0 | Too thick to adhere |
| Vinaisse residue | 2 | Unsatisfactory |
| Corn Syrup Blend | 2 | Unsatisfactory |
| Molasses/Corn Syrup Blend | 2 | Unsatisfactory |
| Liquid Feed Syrup | 2 | Unsatisfactory |
| Molasses By-Product (Colombian) | 4 | Satisfactory |
| Molasses By-Product (Venezuelan) | 5 | Best |

Viscosity is a measure of the deformation of a liquid under stress and its importance to deicing liquids was recognized in U.S. Pat. No. 6,299,793 as well U.S. Pat. No. 5,635,101. There are three aspects where viscosity of a deicing liquid has an impact on use and performance:

(a) Storage.

When the viscosity is low insoluble materials in agricultural waste liquids separate out to form a sticky mass which is very difficult to reincorporate and causes blockage of spray tips. The speed of settlement is inversely proportional to the viscosity of the liquid. Deicing liquids with high viscosities can, at low temps, produce very thick liquids which are difficult to pump and incorporate with other substances used in the manufacture of deicing liquids. Stokes' Law shows the relationship between viscosity and speed of settlement.

(b) Retention Time on Roadways.

Here a viscosity balance is required to allow the deicing liquid to flow and wet out the roadway surface but not run off onto the road shoulders.

(c) Retention Time in Stockpiles of Salt, Aggregates and Salt/Aggregate Mixture.

Again a balance in viscosity properties is required. At low viscosities the liquid deicer percolates the stockpile and runs out into adjacent ground causing ecological problems and the components in the stockpile will cement together. At high viscosities little penetration of the stockpile occurs and cementing of components will occur. The Washburn-Rideal Equation demonstrates the relationship between the distance traveled by the liquid and the viscosity, again this is an inverse relationship.

The viscosities of deicing liquids were measured using the rotational Brookfield viscometer (ASTM D 2196) at various temperatures. For 15% magnesium chloride aqueous solution the results were as shown in Table 15:

TABLE 15

| Temperature | | Viscosity |
|---|---|---|
| ° C. | ° F. | (centiopoises) |
| 0 | 32 | 4.61 |
| −5 | 23 | 5.45 |
| −10 | 14 | 6.63 |
| −13 | 8.6 | 7.56 |

This shows that the $MgCl_2$ solution maintains its very low viscosity even at low temperatures and will run off roads and percolate through stockpiles very readily.

In Table 16 a Brewers Condensed Solids (BCS)/$MgCl_2$ mixture gives different results. The $MgCl_2$ was 15% and the carbohydrate content about 12% plus high molecular weight components e.g. cellulosics.

TABLE 16

| Temperature | | Viscosity | |
|---|---|---|---|
| ° C. | ° F. | (centipoises) | Comments |
| 20 | 68 | 32 | Calculated |
| 10 | 50 | 55 | Calculated |
| 0 | 32 | 99.3 | Measured |
| −5 | +23 | 131.1 | Measured |
| −10 | +14 | 178.7 | Measured |
| −13 | +8.6 | 224.2 | Measured |
| −18 | −0.4 | 314 | Calculated |
| −25 | −13 | 514 | Calculated |

Commercially large amounts of this BCS/MgCl$_2$ aqueous solution were used throughout one winter season with excellent results and so the above viscosity/temperature profile was chosen as the standard. The storage characteristics were also quite satisfactory.

The various agricultural by-products (ABPs) used for ice melting compositions, as noted elsewhere, frequently include extraneous materials that add nothing to performance, but can be a problem in use. These problem areas include elements such as clogging of lines and nozzles, settling out of sediment, contribution to biological degradation, slipperiness and low viscosity. It is therefore desirable to remove such materials to the extent possible without affecting performance and quality.

Most of the ABPs used have differing qualities at lower temperatures −1.1° C. (30° F. or lower) than at higher temperatures 7.2° C. (45° F. or higher) and so all characteristics must be targeted for low temperature use. Of particular concern is the nature of the particulates at low temperature, many times they will become sticky or tacky and adhere to each other and if compressed will form a grease like or gelatinous layer, thus preventing effective normal filtration measures due to plugging and short media life.

Systems that employ gravity or centrifuge filtration seem to provide the best system for removal of particulates at low temperatures, and can be designed with flow characteristics that are compatible with normal truck loading rates. Concern must also be focused on the treating or rinsing of the filter medium, as disposal costs are also a concern and product cost is always an issue for the ultimate user. One effective system for filtration uses waste water treatment equipment in the reverse fashion from its design, and allows the user to vary the flow rates, as well as accumulate any discharged materials for disposal and can be adapted for differing size particles.

The incorporation of a filtration system into any ABPs delivery system is an absolute necessity if consistent quality product is to be delivered to the end user. Many customers, in the early days of these products, or when sourced from suppliers that are unfamiliar with the above described equipment, have experienced unnecessary breakdowns and failures due to these issues.

Testing for and removal of solids formed in deicing liquids.

Since the usual components of deicing liquids consist of commercially available agricultural by-products and inorganic chloride solutions with wide ranges of constituents, it is not surprising that sediments are formed on storage, alone and when mixed. At storage temperatures from 5 to 30° C. (50 to 86° F.) particles, such as cellulose derivatives and bagasse, settle readily followed by chemical precipitates e.g. calcium sulfate, calcium phosphates, phytates and magnesium phosphates. Organic constituents such as proteins and higher molecular weight carbohydrates "salt out" due to the presence of high concentrations of inorganic chlorides forming flocs (open structured aggregates) and sediments.

At low storage temperatures in the −15 to −5° C. (+5 to +23° F.) range, crystallization of inorganic chlorides can occur depending upon concentration and temperature. In addition sulfate ion presence can cause crystallization due to high eutectic points, e.g. magnesium sulfate has a eutectic temperature of −3.9° C. (+25° F.) and sodium sulfate −1.1° C. (+30° F.).

The net result are problems with the storage and handling of liquid deicers and their components, and the presence of sediments causes blocking of the spray tips used in the application of the deicer to roads and piles of rock salt, sand and aggregates.

The initial testing consists of straining through sieves (ASTM E11 Wire Cloth Sieves for Testing Purposes) ranging from No. 10 for coarse contamination to No. 80 for fine contaminants. The retained material is weighed and examined microscopically to determine possible origin. The agricultural by-product and the inorganic chloride solution are separately tested at room temperature 20° C. (68° F.) as well as the mixed liquid deicer solution. The latter is allowed to stand at room temperature for 72 hours before being subjected to the sieve test. This will show any precipitate due to chemical reactions or the salting out of organic constituents.

For stability at low temperatures the mixed liquid deicer is placed in a graduated cylinder and stored at −15° C. (+5° F.) for 48 hours and examined for phase separation and settlement. The cold deicer is then passed through sieves No. 10 and No. 80. Coarse crystals are shown by the No. 10 sieve which has a sieve opening of 78.7 mils i.e. 0.0787 inch. The Pacific Northwest States of Idaho, Montana, Oregon and Washington in their Deicer Specifications Test Method C determine the volume of total settled solids by using a graduated one liter cone (Imhoff) and test temperatures of −17.8° C. (0° F.) for magnesium chloride based deicers. They are stored at these temperatures for 168 hours. After determining the volume of settled substances the cold deicer is passed through a No. 10 sieve.

The criterion for the sieve size is dependent upon the tip size in the sprayhead used to apply the liquid deicer. This tip diameter is usually 10 mils (i.e. 0.010 inch) and so the sieve employed as a final step is No. 80 which has a sieve opening of 7 mil (i.e. 0.007 inch). For a deicing formulation of the present invention to be effective for use, 100% of the formulation must pass through a No. 80 sieve at a temperature of 20° F. or lower.

The composition of the concentrated corn steep liquors vary appreciably and show considerable batch to batch variations. The chemical reactions involved in the manufacturing process is very complex involving sulfur dioxide, sulfurous acid, bacterial flora (especially lactobacilli), lactic acid formation and its influence of the fermentation processes. The liquors contain a wide range of nutrients including carbohydrates, proteins, various organic compounds, heavy metals, inorganic ions, inorganic phosphates, phytic acid and its derivatives (aka myo-inositol phosphates). Carbohydrates identified include the monosaccharides fructose, glucose, galactose, arabinose, and xylose as well as the di- and tri saccharides sucrose, maltose, raffinose, melibiose and trehalose. The major carbohydrates present are fructose, glucose, galactose, sucrose and raffinose.

The carbohydrate content of the CCSL (Hull, S. R. et al) varies from about 2.7 to 9.6% by weight of a liquor with a total solids content of 45%. A European source of corn steep liquor (Hansa Melasse Handelsgesellschaft, Hamburg, Germany) has 9 to 15% carbohydrates for liquors with 40 to 45% solids content. Protein contents also varied from 16% (Minnesota Corn Processors, Inc.) to 38% (Hansa). Some 17 amino acids were identified by Hull with comparatively high levels of glutamic acid, leucine, proline and aspartic acid. Lactic acid concentrations varied from about 2.8 to 4.8%

Heavy Metals, Phosphorus and Cyanide Contents.

Environmental concerns necessitate the examination for, and determination of various heavy metals. Phosphorus content is also an important aspect since overloading waterways with soluble phosphorus compounds can lead eventually to eutrophication. Cyanide content is also important in that unsuitably high amounts present unacceptable toxic risks.

Typical heavy metal, phosphorus and cyanide values found in commercial magnesium chloride aqueous solutions are shown in Table 17:

TABLE 17

|  | Middle East (Jordan) | European |
|---|---|---|
| Arsenic | — | 1.0 ppm |
| Barium | 6.9 ppm | 0.5 ppm |
| Cadmium | Less than 1 ppm | 0.05 ppm |
| Chromium | Less than 1 ppm | 0.5 ppm |
| Copper | Less than 1 ppm | 0.1 ppm |
| Lead | Less than 10 ppm | 0.5 ppm |
| Mercury | Less than 0.004 ppm | 0.02 ppm |
| Selenium | — | 1.0 ppm |
| Zinc | Less than 1 ppm | 0.05 ppm |
| Cyanide | — | 0.05 |
| Phosphorus | 27 ppm | Nil |

Maximum contents of heavy metal, phosphorus and cyanide for DCS, BCS and CCSL are as follows in Table 18:

TABLE 18

| | Maximum Values in ppm of Liquid | | |
|---|---|---|---|
| Element | DCS | BCS | CCSL |
| Arsenic | 0.5 | 0.5 | 0.5 |
| Barium | 10.0 | 10.0 | 10.0 |
| Cadmium | 0.2 | 0.2 | 0.2 |
| Chromium | 1.0 | 1.0 | 1.0 |
| Copper | 7.0 | 7.0 | 7.0 |
| Lead | 1.0 | 1.0 | 1.0 |
| Mercury | 0.05 | 0.05 | 0.05 |
| Selenium | 1.0 | 1.0 | 1.0 |
| Zinc | 10.0 | 20.0 | 10.0 |
| Cyanide | 0.2 | 0.2 | 0.2 |
| Phosphorus | 400 | 4000 | 25,000 |

While the present invention has been particularly shown and described with reference to the preferred mode as illustrated, it will be understood by one skilled in the art that various changes in detail may be effected therein without departing from the spirit and scope of the invention as defined by the claims.

We claim:

1. A deicing formulation which comprises:
  (a) at least one material selected from the group consisting of brewers condensed solubles, distillers condensed solubles and condensed corn steep liquor having a low molecular weight carbohydrate fraction having a molecular weight of about 180 to 1500 in a concentration of about 3 to 60 wt %;
  (b) a chloride salt in a concentration of about 5 to 35 wt %; and
  (c) water balance; with said formulation having the following properties:
  viscosity—100 to 140 centipoises at 0° C. (32° F.)
  liquid adhesion rating—at least about 4
  freezing point—threshold value −25° C. (−13° F.).

2. The formulation of claim 1 in which the molecular weight of the low molecular weight carbohydrate fraction is about 180 to 1000.

3. The formulation of claim 1 in which 100% of the formulation can pass through a No. 80 sieve at a temperature of about −6.7° C. (20° F.) or lower.

4. A deicing formulation which comprises:
  (a) at least one material selected from the group consisting of brewers condensed solubles, distillers condensed solubles and condensed corn steep liquor having a low molecular weight carbohydrate fraction having a low molecular weight of about 180 to 1500 in a concentration of about 3 to 60 wt %;
  (b) a chloride salt in a concentration of about 5 to 35 wt %; and
  (c) water balance; with said formulation having the following properties:
  viscosity—100 to 140 centipoises at 0° C. (32° F.)
  freezing point—threshold value −25° C. (−13° F.)
  100% of the formulation can pass through a No. 80 sieve at a temperature of about −6.7° C. (20° F.) or lower.

5. The formulation of claim 4 in which the molecular weight of the low molecular weight carbohydrate fraction is about 180 to 1000.

6. The formulation of claim 4 in which said formulation has a liquid adhesion rating of at least about 4.

7. A deicing formulation in the form of an aqueous solution which comprises:
  (a) brewers condensed solubles having a low molecular weight carbohydrate fraction in a concentration of about 3 to 60 wt %;
  (b) a chloride salt in a concentration of about 5 to 35 wt %; and
  (c) balance water;
  with said carbohydrate component having a molecular weight of about 180 to 1500 in a concentration sufficient to reduce the freezing point of said formulation to at least as low as about −25° C. (−13° F.), and where 100% of said formulation can pass through a No. 80 sieve at a temperature of −6.7° C. (20° F.) or lower.

8. The formulation of claim 7 which has a viscosity of about 100 to 140 centipoises at 0° C. (32° F.).

9. The formulation of claim 7 in which the liquid adhesion rating of the formulation is at least about 4.

10. A deicing formulation in the form of an aqueous solution which comprises:
  (a) distillers condensed solubles having a low molecular weight carbohydrate fraction in a concentration of about 3 to 60 wt %;
  (b) a chloride salt in a concentration of about 5 to 35 wt %; and
  (c) balance water;
  with said carbohydrate component having a molecular weight of about 180 to 1500 in a concentration sufficient to reduce the freezing point of said formulation to at least as low as about −25° C. (−13° F.), and where 100% of said formulation can pass through a No. 80 sieve at a temperature of −6.7° C. (20° F.) or lower.

11. The formulation of claim 10 which has a viscosity of about 100 to 140 centipoises at 0° C.

12. The formulation of claim 10 in which the liquid adhesion rating is at least about 4.

13. A deicing formulation in the form of an aqueous solution which comprises:
  (a) condensed corn steep liquor having a low molecular weight carbohydrate fraction in a concentration of about 3 to 60 wt %;
  (b) a chloride salt in a concentration of about 5 to 35 wt %; and
  (c) balance water;
  with said carbohydrate component having a molecular weight of about 180 to 1500 in a concentration sufficient to reduce the freezing point of said formulation to at least as low as about −25° C. (−13° F.) and where 100% of the formulation can pass through a No. 80 sieve at a temperature of 20° F. or lower.

14. The formulation of claim 13 which has a viscosity of about 100 to 140 centipoises at 0° C.

15. The formulation of claim 13 in which the liquid adhesion rating is at least about 4.

16. A method of forming a de-icing and anti-icing composition which comprises:
   (a) providing an aqueous solution which contains at least one material selected from the group consisting of brewers condensed solubles, distillers condensed solubles and condensed corn steep liquor having a low molecular weight carbohydrate fraction having a molecular weight of about 180 to 1500 in a concentration of about 3 to 60 weight percent, a chloride salt in a concentration of about 5 to 35 weight percent and water balance; and
   (b) applying said aqueous solution to a source of particulate material selected from the group consisting of salt, sand and aggregates, and mixtures thereof.

17. The method of claim 16 in which 100% of said aqueous solution can pass through a No. 80 sieve at a temperature of about −6.7° C. (20° F.) or lower.

18. A method for reducing the buildup of snow and ice on an outdoor surface, comprising:
   applying to the outdoor surface a composition comprising:
   an aqueous solution which contains at least one selected from the group consisting of brewers condensed solubles, distillers condensed solubles and condensed corn steep liquor, and a chloride salt in which the constituents are present in the following concentration:

|  | Weight % |
|---|---|
| brewers condensed solubles, distillers condensed solubles, condensed corn steep liquor | 3 to 60 |
| Chloride Salt | 5 to 35 |
| Water | Balance | and where each of said brewers condensed solubles, distillers condensed solubles and condensed corn steep liquor contains a low molecular weight carbohydrate fraction having a molecular weight in the range of about 180 to 1500.

19. The method of claim 18 in which 100% of said aqueous solution can pass through a No. 80 sieve at a temperature of about −6.7° C. (20° F.) or lower.

* * * * *

UNITED STATES PATENT AND TRADEMARK OFFICE
CERTIFICATE OF CORRECTION

| | | |
|---|---|---|
| PATENT NO. | : 7,045,076 B2 | Page 1 of 1 |
| APPLICATION NO. | : 10/913175 | |
| DATED | : May 16, 2006 | |
| INVENTOR(S) | : Robert A. Harley et al. | |

It is certified that error appears in the above-identified patent and that said Letters Patent is hereby corrected as shown below:

Column 9 line 41 change "The microscope slide was withdra the" to --The microscope slide was withdrawn from the--

Signed and Sealed this

Fifth Day of September, 2006

JON W. DUDAS
*Director of the United States Patent and Trademark Office*